(12) United States Patent
Yamagiwa et al.

(10) Patent No.: US 7,228,731 B2
(45) Date of Patent: Jun. 12, 2007

(54) MOUNTING STRUCTURE OF TIRE PRESSURE SENSING SYSTEM

(75) Inventors: Toshio Yamagiwa, Saitama (JP); Masayoshi Orita, Saitama (JP); Tomoyuki Harada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/774,446

(22) Filed: Feb. 10, 2004

(65) Prior Publication Data
US 2004/0183658 A1    Sep. 23, 2004

(30) Foreign Application Priority Data
Feb. 12, 2003   (JP)   .............. 2003-033804

(51) Int. Cl.
  *B60C 15/00*   (2006.01)
(52) U.S. Cl. ............... 73/146; 73/146.5; 73/146.3
(58) Field of Classification Search .......... 152/418, 152/415, 152.1, 427, 382, 379.5; 340/427, 340/445, 531, 447; 73/146, 146.3, 146.5, 73/146.8, 146.4; 301/65, 64.1
See application file for complete search history.

(56) References Cited

U.S. PATENT DOCUMENTS

| 4,235,184 A | * | 11/1980 | Schiavone ............... 116/34 R |
| 6,672,150 B2 | * | 1/2004 | Delaporte et al. .......... 73/146.2 |
| 6,725,711 B2 | * | 4/2004 | Bunya et al. ................ 73/146 |
| 6,805,000 B1 | * | 10/2004 | Sheikh-Bahaie ........... 73/146.8 |
| 2001/0030601 A1 | * | 10/2001 | Nigon et al. |
| 2004/0149025 A1 | * | 8/2004 | Toyofuku ................... 73/146 |
| 2004/0263324 A1 | * | 12/2004 | Sanchez et al. ............ 340/442 |

FOREIGN PATENT DOCUMENTS

| DE | 196 26 446 A1 | 1/1998 |
| EP | 1 162 089 A2 | 12/2001 |

* cited by examiner

*Primary Examiner*—Jason R. Bellinger
(74) *Attorney, Agent, or Firm*—Birch, Stewart, Kolasch & Birch, LLP

(57) ABSTRACT

A mounting structure for a tire pressure sensing system. The tire pressure sensing system includes a pressure sensor placed on a wheel to sense pressure of a tire which is mounted on the wheel. The wheel is a cast wheel for a vehicle including a rim portion where the tire is mounted, a hub portion provided at the center of the rim portion, and spoke portions connecting the rim portion and the hub portion. The pressure sensor is placed in a boundary portion between the rim portion and the spoke portions. Since the pressure sensor is placed in the boundary portion between the rim portion and the spoke portions, a portion protruding into the tire when replacing a tire can be reduced. Consequently, workability for tire replacement can be improved.

20 Claims, 11 Drawing Sheets

MOUNTING STRUCTURE OF TIRE PRESSURE SENSING SYSTEM

CROSS-REFERENCE TO RELATED APPLICATION

The present application claims priority under 35 U.S.C. §119 to Japanese Patent Application No. 2003-033804, filed on Feb. 12, 2003, the entire contents of which are hereby incorporated by reference.

BACKGROUND OF THE INVENTION

1. Field of the Invention

The present invention relates to a mounting structure of a tire pressure sensing system.

2. Description of Background Art

Known is a mounting structure of a tire pressure sensing system, in which a pressure sensor is mounted on a periphery of a wheel (see Patent Document 1, for example Japanese Patent Laid-Open Publication No. Heisei 10-44726 (Page 3, FIG. 1)

FIG. 1 of the above publication is reproduced herein to describe the aforementioned technology. Note that the reference numerals in the publication are re-assigned so that new reference numerals are provided, and the names in the publication are also partially changed.

FIG. 11 of the present application is a reproduction of FIG. 1 of Japanese Patent Laid-Open Publication No. Heisei 10-44726. In the mounting structure of a tire pressure sensing system 200, the tire pressure sensing system 201 is constructed by an air valve 204 attached to a rim portion 203 of a wheel 202, a case 206 placed on a base portion 205 of the air valve 204, a pressure sensor 207 accommodated in the case 206, a signal processing circuit 208 and a battery 209. It can be said that the tire pressure sensing system 200 has a construction in which main members of the tire pressure sensing system 201 are integrally attached to the air valve 204.

However, since the above described mounting structure of a tire pressure sensing system 200 has the construction where the main members of the tire pressure sensing system 201 are integrally attached to the air valve 204, the weight of the tire pressure sensing system 201 is concentrated in the vicinity of the air valve 204. Therefore, the dynamic balance of the wheel 202 is disrupted and a large balance weight (not shown) for correcting the dynamic balance is thus required. This may increase the weight of the wheel 202.

Further, in the aforementioned mounting structure of a tire pressure sensing system 200, the tire pressure sensing system 201 has a shape protruding from the circumference of the rim portion 203 of the wheel 202. Thus, when replacing a tire, cares should be taken in order not to break the tire pressure sensing system 201, which results in low workability for tire replacement.

SUMMARY AND OBJECTS OF THE INVENTION

An object of the present invention is to provide a mounting structure of a tire pressure sensing system which can keep dynamic imbalance of a wheel at a minimum, and to improve workability in replacing a tire.

In order to attain the above mentioned object, a first aspect of the invention provides a mounting structure of a tire pressure sensing system wherein a tire pressure sensing system in which a pressure sensor is placed on a wheel to sense pressure of a tire mounted on the wheel, the wheel is a cast wheel for a vehicle which is constructed by a rim portion where the tire is mounted, a hub portion provided at a center of the rim portion, and a spoke portion connecting the rim portion and the hub portion, and the pressure sensor is placed in a boundary portion between the rim portion and the spoke portion.

For example, in terms of reducing the weight of the wheel, it is favorable that the dynamic balance of the tire can be corrected by the use of a small balance weight. In addition, in terms of improving workability for tire replacement, it is favorable that the pressure sensor and the like which are main parts of the tire pressure sensing system are placed so as not to be obstacles when a tire is replaced.

Accordingly, when the wheel is the cast wheel for a vehicle which is constructed by the rim portion where the tire is mounted, the hub portion provided at the center of the rim portion, and the spoke portion connecting the rim portion and the hub portion, the pressure sensor is placed in the boundary portion between the rim portion and the spoke portion. Specifically, by placing the pressure sensor in the boundary portion between the rim portion and the spoke portion, a portion protruding into the tire when replacing the tire can be reduced. Consequently, workability for tire replacement can be improved.

According to a second aspect of the invention, the mounting structure of a tire pressure sensing system includes a recessed portion having a shape recessed toward the hub portion being provided in the boundary portion, and the pressure sensor is placed in the recessed portion.

Since the recessed portion having the shape recessed toward the hub portion is provided in the boundary portion and the pressure sensor is placed in the recessed portion, the pressure sensor does not protrude into the tire and can be lowered down into the spoke portion. Consequently, the workability for tire replacement is further improved.

According to a third aspect of the invention, the mounting structure of a tire pressure sensing system includes the pressure sensor being placed on an opposite side of an air valve which fills air to the tire.

By placing the pressure sensor on the opposite side of the air valve which fills air to the tire, the weight of the wheel is distributed to the weight around the pressure sensor and that of the air valve. Accordingly, tire dynamic imbalance can be kept at a minimum. For example, the dynamic balance of the tire can be corrected by merely attaching a small balance weight, and thus the weight of the wheel can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
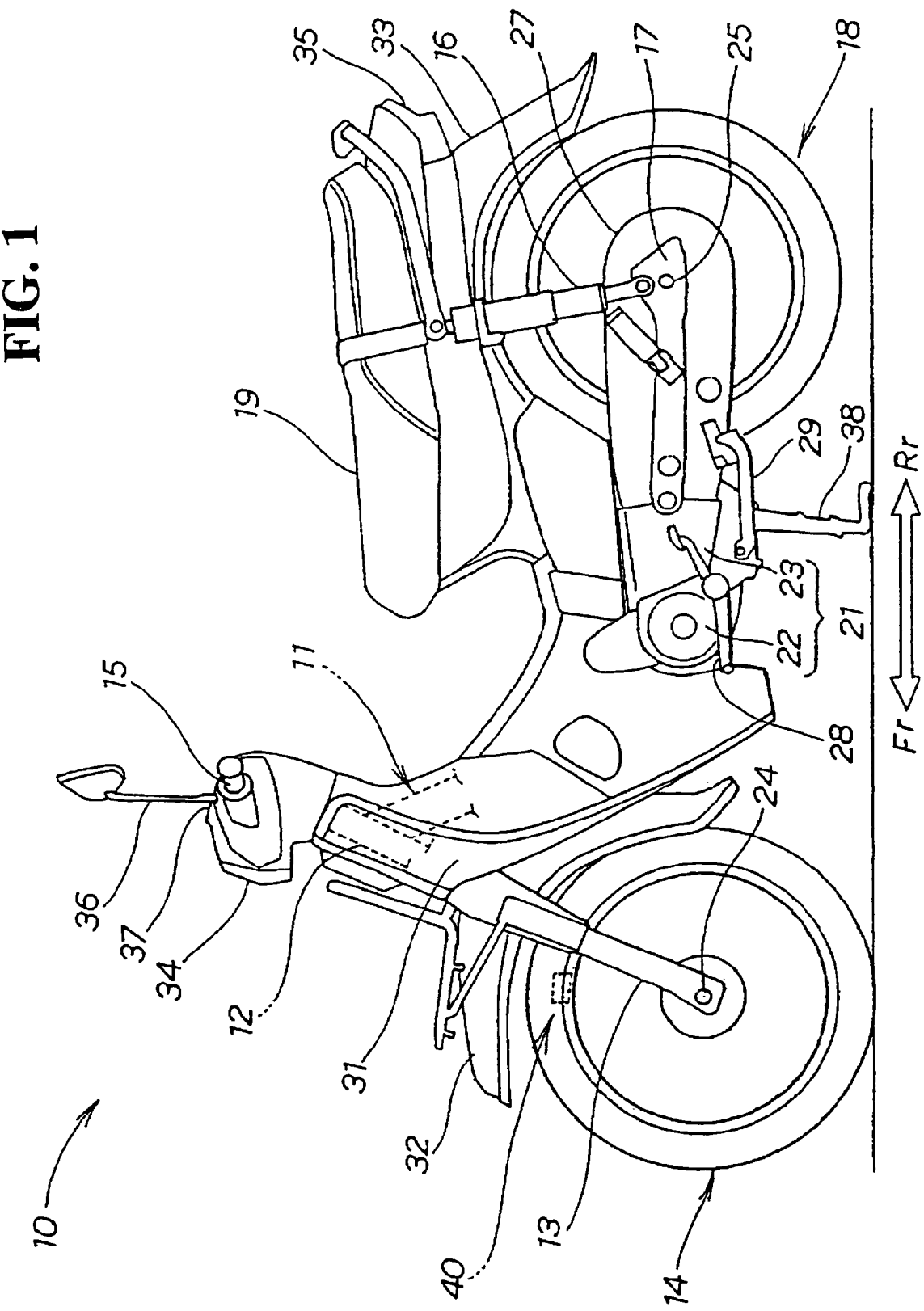
FIG. 1 is a side view of a motorcycle in which a mounting structure of a tire pressure sensing system according to the present invention is employed.

Hereinbelow, embodiments of the present invention are described based on the attached drawings. Note that "front," "rear," "left," "right," "top," and "bottom" are directions based on a driver's view, and symbols Fr, Rr, L, and R denote a front side, a rear side, a left side, and a right side, respectively. The drawings are to be viewed in accordance with directions of reference numerals.

FIG. 1 is a side view of a motorcycle in which the mounting structure of a tire pressure sensing system of the present invention is employed. The motorcycle 10 is a motorbike which is constructed mainly by a body frame 11 extending toward the rear bottom of the vehicle, a head pipe 12 attached to the body frame 11, a front fork 13 attached to the head pipe 12, a front wheel (wheel assembly) 14 attached to the front fork 13, a handle 15 connected to the front fork 13, and a rear suspension 16 whose one end is attached to the rear top of the body frame 11, a swing arm 17 which is swingably attached between the other end of the rear suspension 16 and the rear bottom of the body frame 11, a rear wheel (wheel assembly) 18 attached to an end of the swing arm 17, a seat 19 placed on the rear top of the body frame 11, and a power unit 21 including an engine 22 and a transmission 23 placed at the bottom of the body frame 11.

FIG. 1 shows axles 24, 25, a drive chain cover 27, a brake pedal 28, a kick pedal 29, a leg shield 31, a front fender 32, a rear fender 33, a head lamp 34, a tail lamp 35, a rear-view mirror 36, a meter panel 37, and a stand 38. In addition, the mounting structure 40 of a tire pressure sensing system according to the present invention is shown, and is described below.

Figure 2:
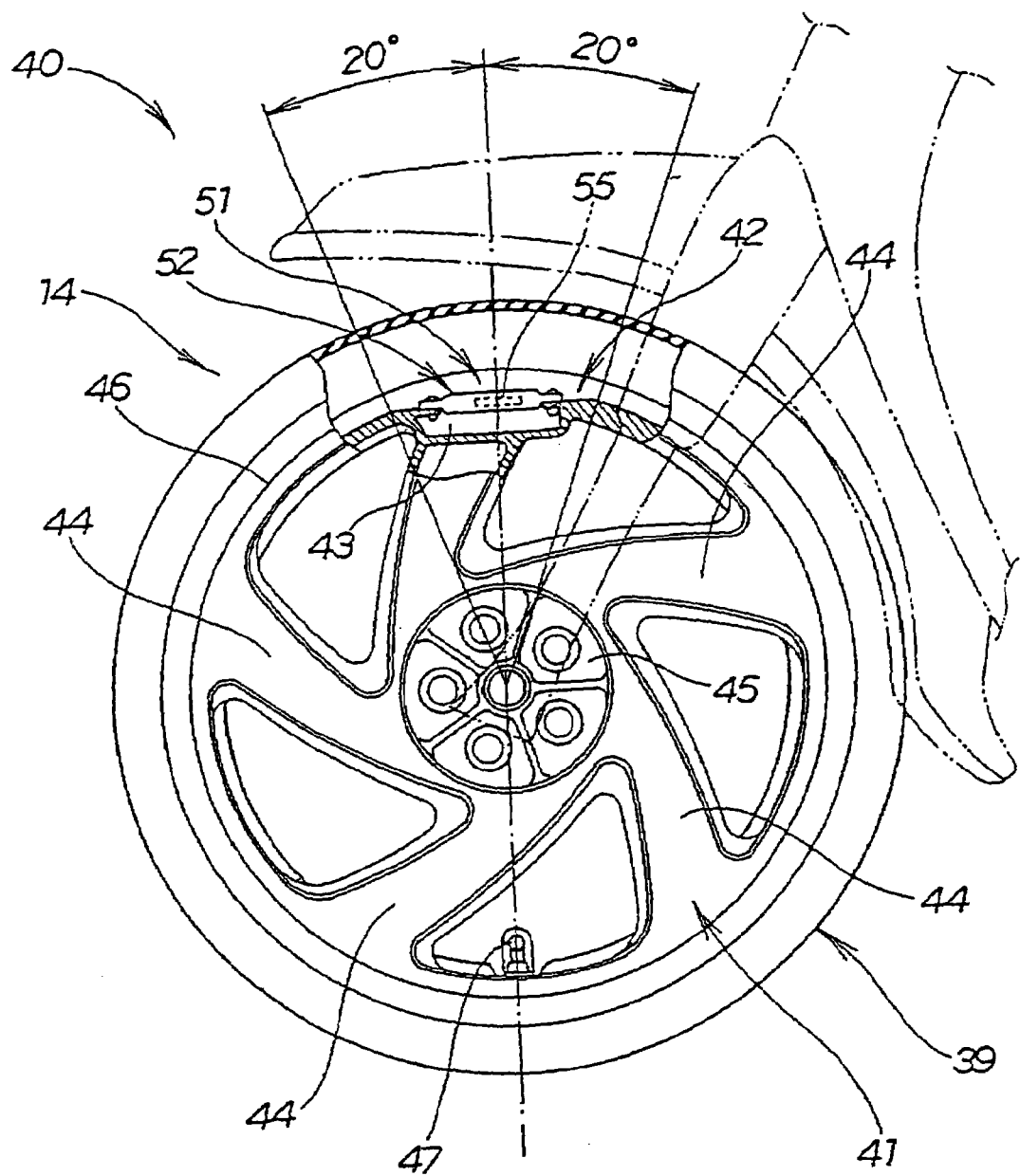
FIG. 2 is a cross-sectional side view of the mounting structure of a tire pressure sensing system according to the present invention.

FIG. 2 is a side view of the mounting structure of a tire pressure sensing system according to the present invention.

In the mounting structure of a tire pressure sensing system 40, the front wheel (wheel assembly) 14 is constructed by a wheel 41, a tire 39 mounted on the wheel 41, and a tire pressure sensing system 51 for sensing the pressure of the tire 39.

The wheel 41 is a cast wheel for a vehicle, including a rim portion 46 where the tire 39 is mounted, a hub portion 45 provided at the center of the rim portion 46, and spoke portions (connecting portions) 44 . . . (indicates a plural numbers and the same below) connecting the rim portion 46 with the hub portion 45. The wheel 41 is provided with an air valve 47 for filling air to the tire 39 provided on the rim portion 26, and the tire pressure sensing system 51 provided on the opposite side of the air valve 47 and placed in a boundary portion 42 between the rim portion 46 and the spoke portions 44.

Note that the wheel 41 is a member formed of an aluminum alloy or a magnesium alloy. It should also be noted that the rear wheel 18 shown in FIG. 1 is a member having almost the same construction as that of the front wheel 14.

In the mounting structure of a tire pressure sensing system 40, the boundary portion 42 is positioned on the opposite side of the air valve 47 which fills air to the tire 39.

By placing a pressure sensor 55 on the opposite side of the air valve 47 which fills air to the tire 39, the weight of the wheel 41 can be distributed in the weight around the pressure sensor 55 (detecting and transmitting unit 52) and that of the air valve 47. Accordingly, tire dynamic imbalance can be kept at a minimum. For example, the dynamic balance of the tire 39 (wheel 41) can be corrected by merely attaching a small balance weight, thus reducing the weight of the wheel 41.

Note that, in the embodiments, an allowable range of the opposite side of the air valve 47 is considered to be a range of +/−20 degrees as shown in FIG. 2.

Figure 3:
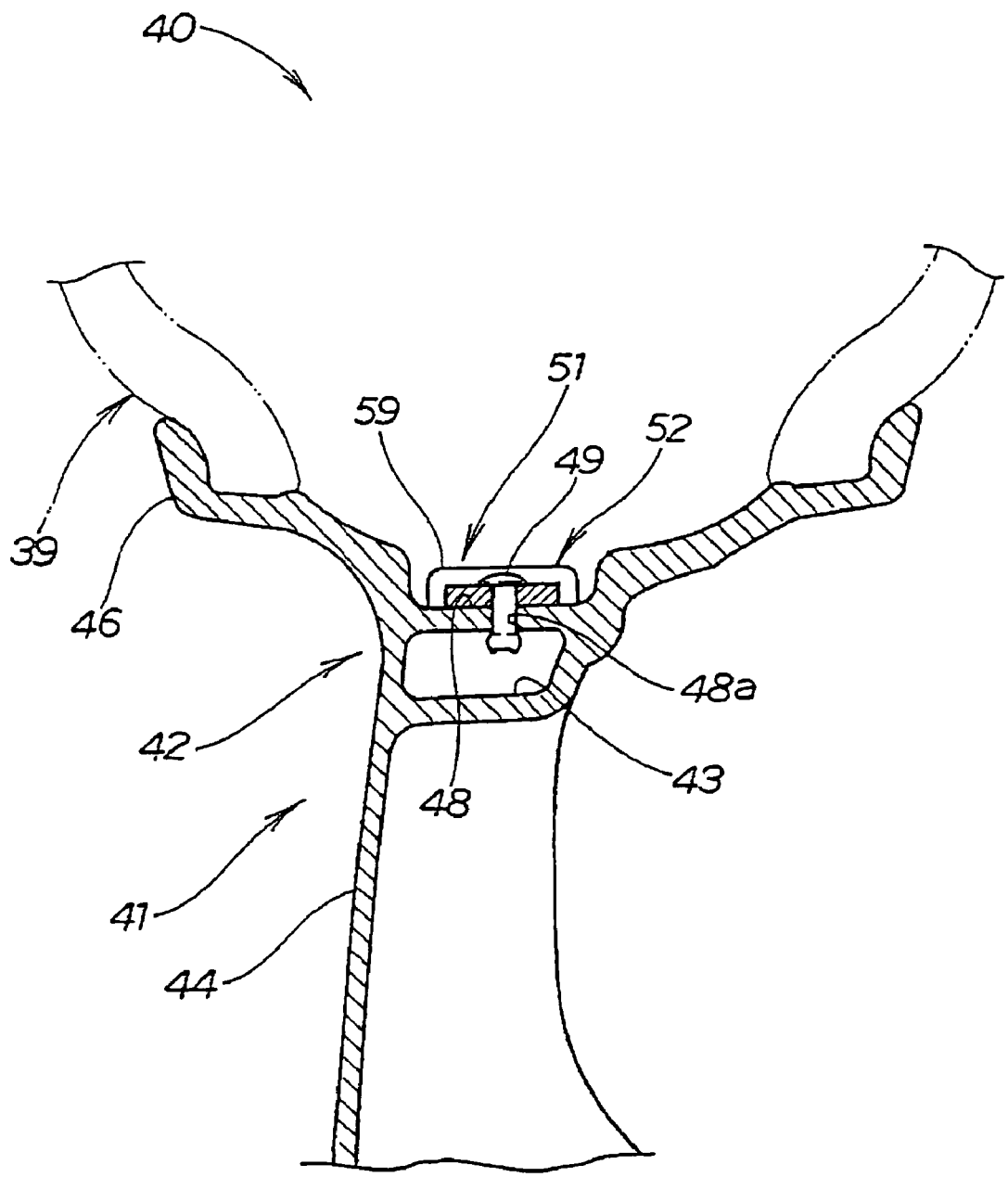
FIG. 3 is a cross-sectional front view of the mounting structure of a tire pressure sensing system according to the present invention.

FIG. 3 is a cross-sectional front view of the mounting structure of a tire pressure sensing system according to the present invention. This drawing shows that, in the mounting structure of a tire pressure sensing system 40, the tire pressure sensing system 51 is placed in the boundary portion 42 (portion shown by a chain double-dashed line) between the rim portion 46 and the spoke portions 44. By placing the pressure sensor 55 (see FIG. 2) in the boundary portion 42 between the rim portion 46 and the spoke portions 44, a portion protruding into the tire when replacing the tire can be reduced. Consequently, workability for tire replacement can be improved.

Moreover, in the mounting structure of a tire pressure sensing system 40, collars 48 and 48 (the collar 48 at the back is not shown) are formed in the boundary portion 42, and mounting holes 48a and 48a (the mounting hole 48aat the back is not shown) are formed in the collars 48 and 48, respectively. The tire pressure sensing system 51 is a mounted on the mounting holes 48a and 48a using rivets 49 and 49 (the rivet 49 at the back is not shown). FIG. 3 also shows a recessed portion 43 formed in the boundary portion 42.

Figure 4:
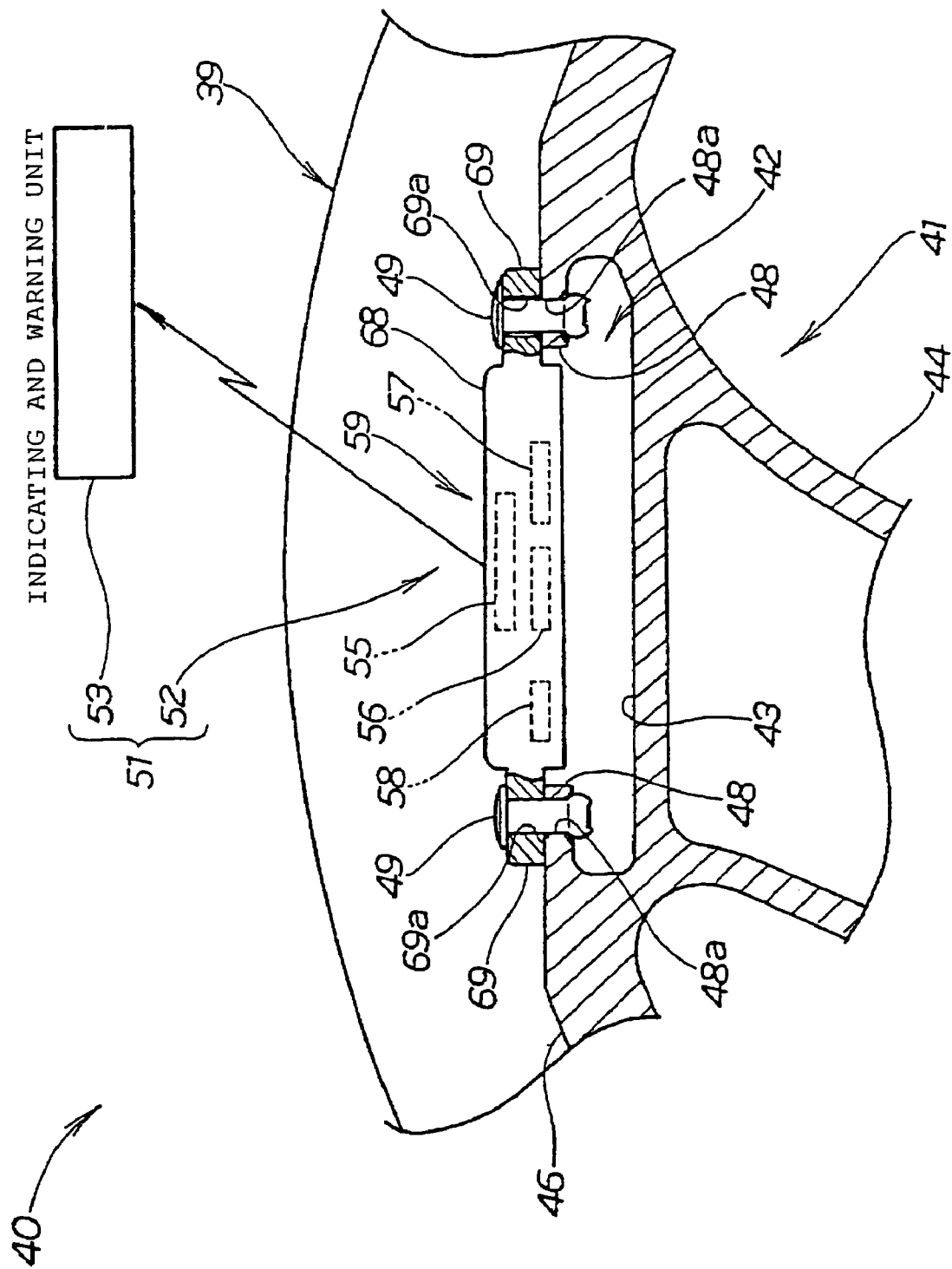
FIG. 4 is a cross-sectional side view of the mounting structure of a tire pressure sensing system according to the present invention.

FIG. 4 is a cross-sectional side view of the mounting structure of a tire pressure sensing system according to the present invention, showing an example of the tire pressure sensing system 51.

The tire pressure sensing system 51 includes the detecting and transmitting unit 52 which detects the pressure of the tire 39 and transmits pressure information, and a indicating and warning unit 53 which is added to the detecting and transmitting unit 52 and thus indicates the pressure of the tire 39 and gives warning based on the pressure information from the detecting and transmitting unit 52. Note that the indicating and warning unit 53 is a unit to be provided in the meter panel 37 (see FIG. 1) as described later.

The detecting and transmitting unit 52 includes the pressure sensor 55 which detects the tire pressure, a detection circuit 56 which is connected to the pressure sensor 55 and thus obtains the pressure information as an electric signal, a transmitting circuit 57 which transmits the electric signal obtained by the detection circuit 56 as an radio wave, a battery 58 for driving the detection circuit 56 and the transmitting circuit 57, and a case 59 which accommodates the pressure sensor 55, the detection circuit 56, the transmitting circuit 57 and the battery 58.

The case 59 includes a body portion 68 which collectively accommodates the pressure sensor 55, the detection circuit 56, the transmitting circuit 57 and the battery 58, and end portions 69 and 69 extending from the body portion 68. The end portions 69 and 69 are provided with through holes 69a and 69a, respectively, thorough which the rivets 49 penetrate.

The mounting structure of a tire pressure sensing system 40 is as follows: in the tire pressure sensing system 51 in which the pressure sensor 55 is placed on the wheel 41 for sensing the pressure of the tire 39 which is mounted on the wheel 41, the wheel 41 is the cast wheel for a vehicle, including the rim portion 46 where the tire 39 is mounted, the hub portion 45 (see FIG. 2) provided at the center of the rim portion 46, and spoke portions 44 connecting the rim portion 46 and the hub portion 45; and the pressure sensor 55 is placed in the boundary portion 42 between the rim portion 46 and the hub portions 44.

In terms of reducing the weight of the wheel, it is favorable that the dynamic balance of the tire can be corrected by the use of a small balance weight. In addition, in terms of improving workability for tire replacement, it is favorable that the pressure sensor and the like which are main parts of the tire pressure sensing system are placed so as not to be obstacles when a tire is replaced.

Thus, when the wheel 41 is the cast wheel for a vehicle, including the rim portion 46 where the tire 39 is mounted, the hub portion 45 (see FIG. 2) provided at the center of the rim portion 46, and the spoke portions 44 connecting the rim portion 46 and the hub portion 45, the pressure sensor 55 is placed in the boundary portion 42 of the rim portion 46 and the spoke portions 44.

In other words, by placing the pressure sensor 55 in the boundary portion 42 between the rim portion 46 and the spoke portions 44, the portion protruding into the tire 39 when replacing the tire 39 can be reduced. Consequently, workability of tire replacement can be improved.

Figure 5:
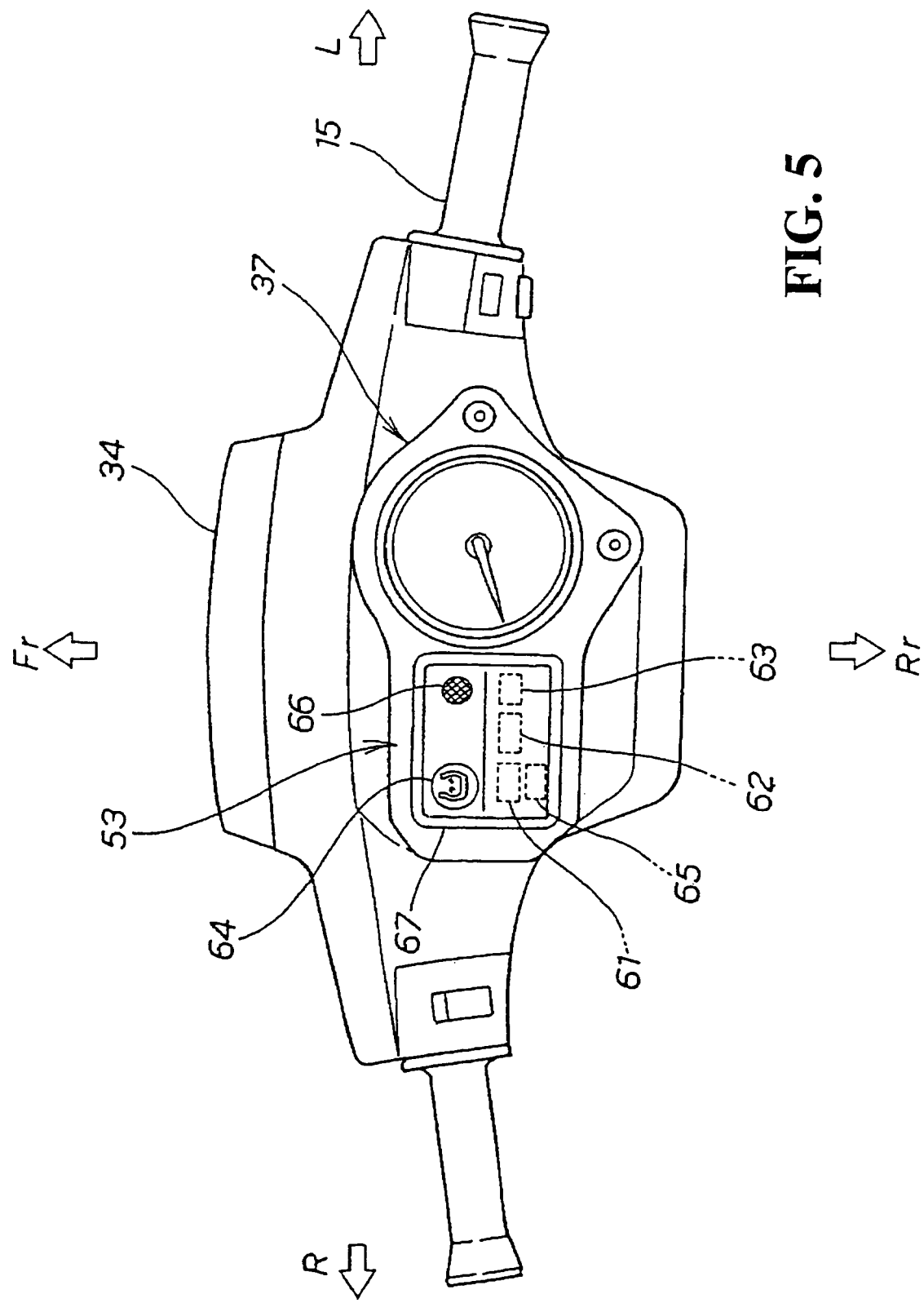
FIG. 5 is an indicating and warning unit in the mounting structure of a tire pressure sensing system according to the present invention.

FIG. 5 is a plan view of the indicating and warning unit of the mounting structure of a tire pressure sensing system according to the present invention, showing a plane of the meter panel 37 attached to the handle 15.

The indicating and warning unit 53 is provided in the meter panel 37 and includes a receiving circuit 61 which receives the radio wave transmitted from the detecting and transmitting unit 52 shown in FIG. 4, the voltage amplifier circuit 62 which amplifies the signal received in the receiving circuit 61, an indicating circuit 63 which indicates the tire pressure based on a voltage value which was amplified in the voltage amplifier circuit 62, and indicating means 64 which is driven by the indicating circuit 63. The indicating and warning unit 53 also includes a warning driving circuit 65 actuated when the voltage value amplified in the voltage amplifier circuit 62 is lower than a previously set voltage value, warning means 66 driven by the warning driving circuit 65, and a housing 67 which collectively accommodates the receiving circuit 61, the voltage amplifier circuit 62, the indicating circuit 63, the indicating means 64, the warning driving circuit 65 and the warning means 66.

Figure 6:
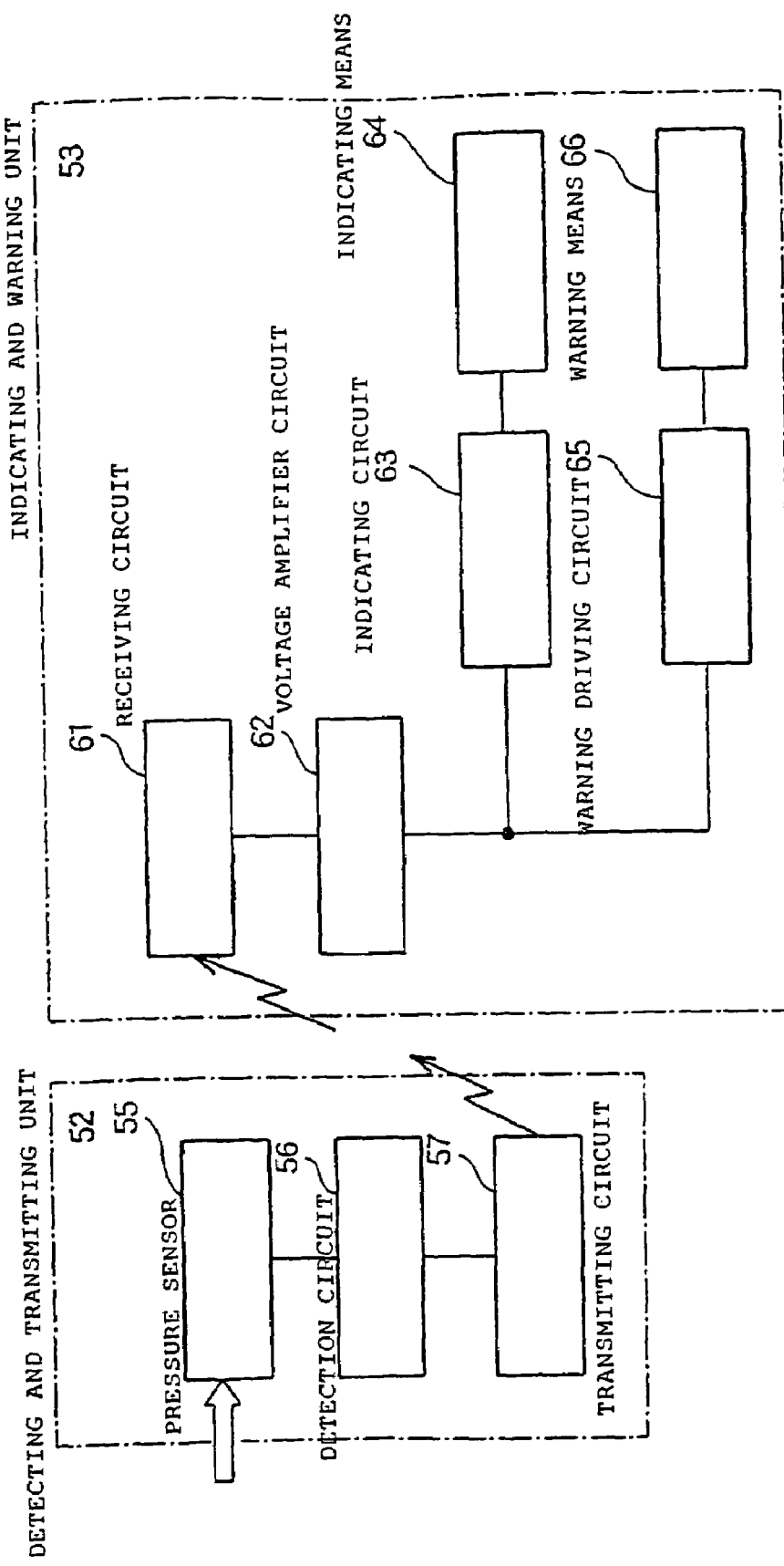
FIG. 6 is a block diagram of a pressure sensing system in the mounting structure according to the present invention.

FIG. 6 is a block diagram of the pressure sensing system in the mounting structure according to the present invention, explaining an operation of the tire pressure sensing system 51 (see FIG. 4).

First of all, the tire pressure is detected by the pressure sensor 55, the detection circuit 56 obtains the pressure information as an electric signal, and then the transmitting circuit 57 transmits the electric signal to the indicating and warning unit 53 as a radio wave.

Next, the radio wave transmitted from the detecting and transmitting unit 52 is received by the receiving circuit 61, and the signal received by the receiving circuit 61 is amplified by the voltage amplifier circuit 62. Based on the voltage value amplified by the voltage amplifier circuit 62, the indicating circuit 63 converts the signal into a predetermined signal in order to indicate the tire pressure, and the indicating means 64 indicates the tire pressure.

Moreover, when the voltage value amplified by the voltage amplifier circuit 62 is lower than a previously set voltage value, the warning driving circuit 65 is actuated so that the warning means 66 notifies that the tire pressure is insufficient.

Figure 7:
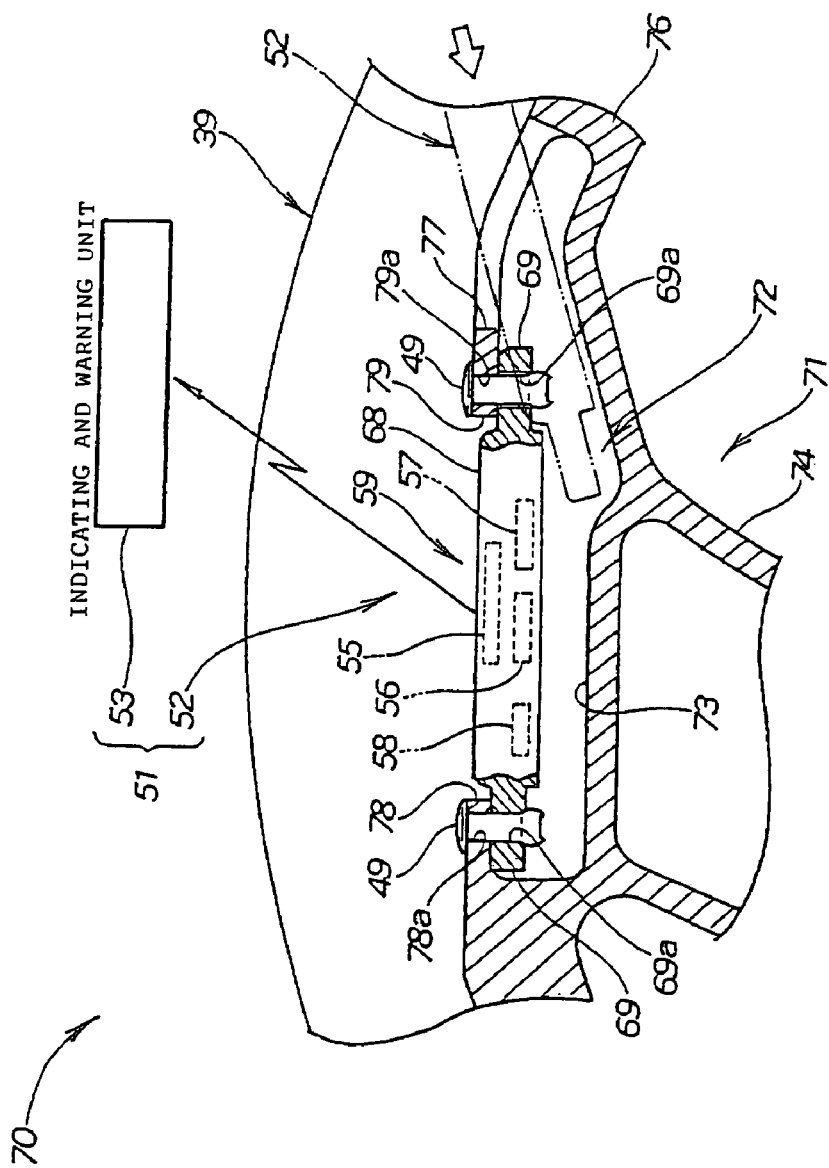
FIG. 7 is a cross-sectional side view of a mounting structure of a tire pressure sensing system of a second embodiment according to the present invention.

FIG. 7 is a cross-sectional side view of a mounting structure of a tire pressure sensing system of a second embodiment according to the present invention. The same parts as those used in the mounting structure of a tire pressure sensing system 40 (see FIG. 4) are denoted by the same referential numerals, and detailed description thereof is omitted.

In the mounting structure of a tire pressure sensing system 70, a recessed portion 73 is formed in a boundary portion 72 between a rim portion 76 and spoke portions (connecting portions) 74 of a wheel 71. In addition, an insertion hole 77 is formed, through which a detecting and transmitting unit 52 is inserted into the recessed portion 73, and collars 78 and 79 where the detecting and transmitting unit 52 is mounted are formed in the boundary portion 72. The detecting and transmitting unit 52 shown by a chain double-dashed line is inserted from the insertion hole 77 as shown by a hollow arrow, and mounted on the collars 78 and 79 while being accommodated in the recessed portion 73.

FIG. 7 shows the tire 39, a rivet 49, an indicating and warning unit 53, the tire pressure sensing system 51, the pressure sensor 55, a detection circuit 56, a transmitting circuit 57, a battery 58, and through holes 78a and 79a formed in the collars 78 and 79, respectively. Note that the wheel 71 is provided with a hub portion and an air valve which are similar to those in the wheel 41 shown in FIG. 2.

In the mounting structure of a tire pressure sensing system 70, the recessed portion 73 having a shape recessed toward the hub portion 45 (see FIG. 2) is provided in the boundary portion 72, and the pressure sensor 55 is placed in the recessed portion 73.

The recessed portion 73 having the shape recessed toward the hub portion 45 (see FIG. 2) is provided in the boundary portion 72, and the pressure sensor 55 is placed in the recessed portion 73. Thus, the pressure sensor 55 does not protrude into the tire 39 and can be lowered down into the spoke portions 74. Consequently, the workability of tire replacement can be further improved.

Figure 8:
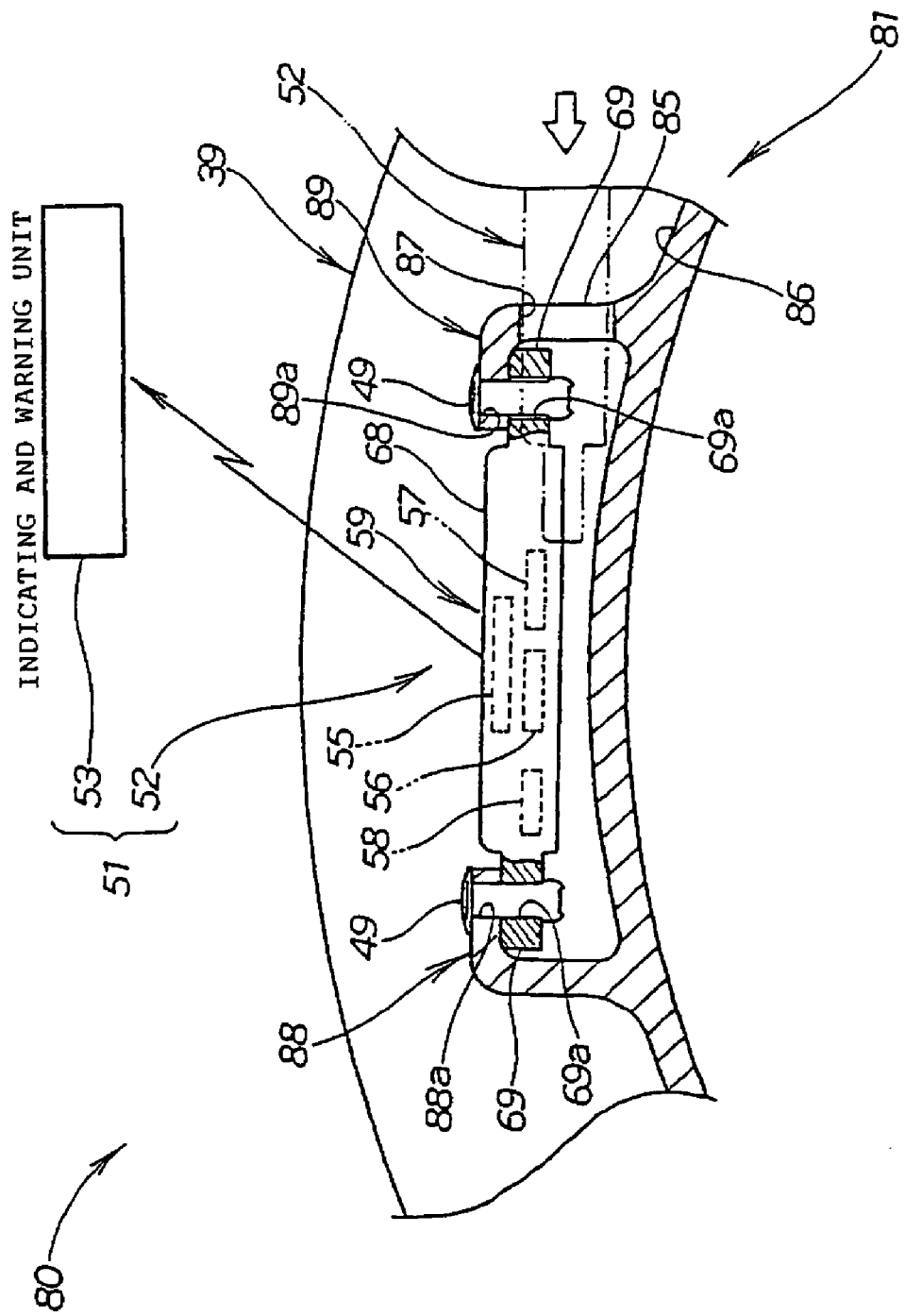
FIG. 8 is a cross-sectional side view of a mounting structure of a tire pressure sensing system of a third embodiment according to the present invention.

FIG. 8 is a cross-sectional side view of a mounting structure of a tire pressure sensing system of a third embodiment according to the present invention. The same parts as those used in the mounting structure of a tire pressure sensing system 40 (see FIG. 4) are denoted by the same referential numerals, and detailed description thereof is omitted.

In the mounting structure of a tire pressure sensing system 80, collars 88 and 89 where a detecting and transmitting unit 52 is mounted are erected from a rim portion 86 of a wheel 81. In an erected wall 85 of one of the collars, an insertion hole 87 is formed where the detecting and transmitting unit 52 in inserted. The detecting and transmitting unit 52 shown by a chain double-dotted line is inserted from the insertion hole 87 as shown by a hollow arrow and mounted on the collars 88 and 89.

FIG. 8 shows the tire 39, a rivet 49, the tire pressure sensing system 51, an indicating and warning unit 53, a pressure sensor 55, a detection circuit 56, a transmitting circuit 57, a battery 58, and through holes 88a and 89a formed in the collars 88 and 89. Note that the wheel 81 is provided with a hub portion and an air valve which are similar to those of the wheel 41 shown in FIG. 2.

In the mounting structure of a tire pressure sensing system 80, the collars 88 and 89 are erected directly from the rim portion 86 of the wheel 81, thus simplifying a mold for the wheel 81.

Figure 9A:
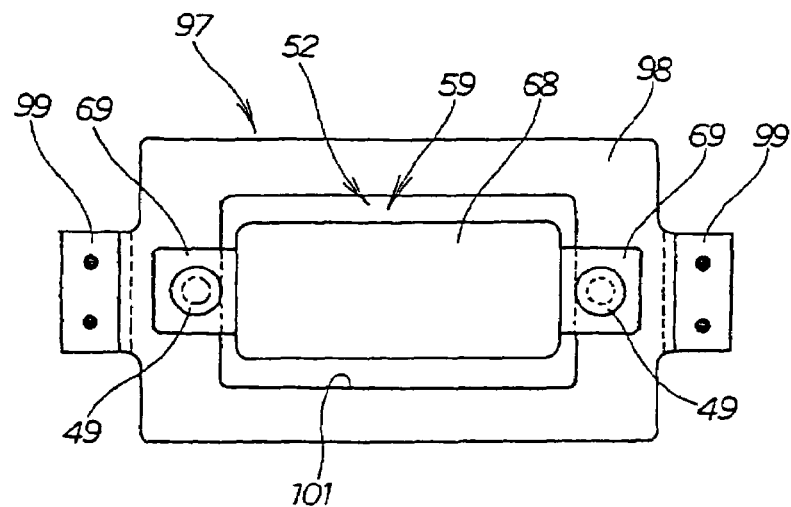
FIGS. 9(a) and 9(b) are explanatory views of a mounting structure of a tire pressure sensing system of a fourth embodiment according to the present invention.
Figure 9B:
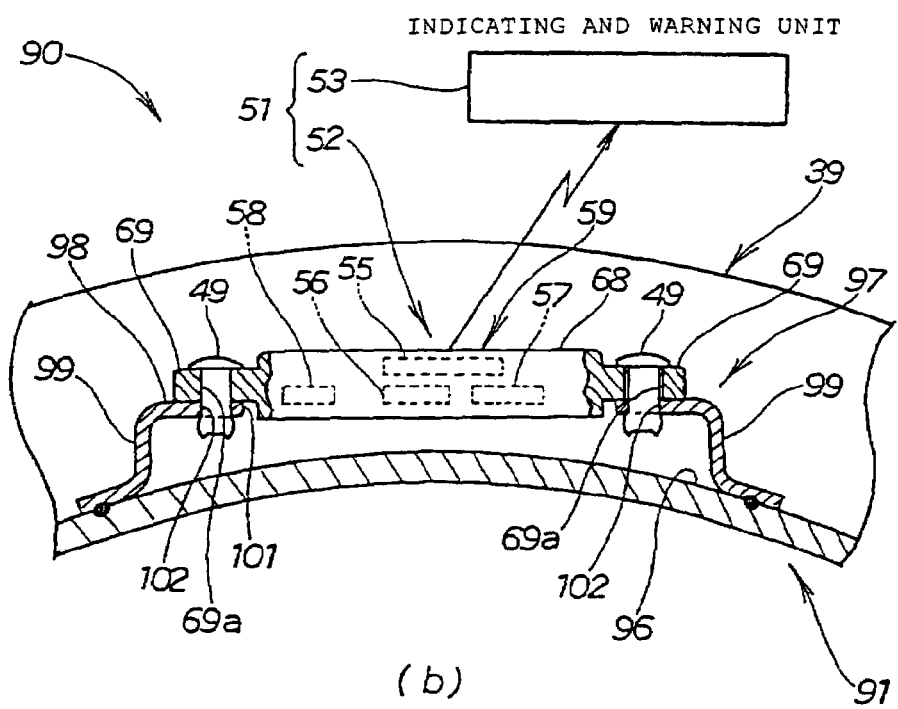

FIGS. 9(a) and 9(b) are explanatory views of a mounting structure of a tire pressure sensing system of a fourth embodiment according to the present invention. The same parts as those used in the mounting structure of a tire pressure sensing system 40 (see FIG. 4) are denoted by the same referential numerals, and detailed description thereof is omitted.

In the mounting structure of a tire pressure sensing system 90, a mounting stay 97 shown in FIG. 9(a) is welded to a rim portion 96 of a wheel 91, and a detecting and transmitting unit 52 is mounted on the mounting stay 97 using rivets 49 and 49.

As shown in FIG. 9(a), the stay 97 includes a mounting portion 98 where the detecting and transmitting unit 52 is mounted, and bent portions 99 and 99 which are formed by bending both ends of the mounting portion 98. These bent portions 99 and 99 are welded to the rim portion 96. An escape hole 101 allows a body portion 68 of a case 59 to escape. A mounting hole 102 is provided for mounting an end 69 of the case 59.

FIG. 9(b) shows the tire 39, a rivet 49, a tire pressure sensing system 51, a detecting and transmitting unit 52, an indicating and warning unit 53, a pressure sensor 55, a detection circuit 56, a transmitting circuit 57, and a battery 58. Note that the wheel 91 is provided with a hub portion, spoke portions and an air valve which are similar to those in the wheel 41 shown in FIG. 2.

In the mounting structure of a tire pressure sensing system 90, the stay 97 is welded to the rim portion 96. Therefore, the wheel 91 is not required to have a special shape. Thus, the wheel 91 without the tire pressure sensing system 51 can be used as it is, and thereby the wheel 91 can be generalized.

Figure 10:
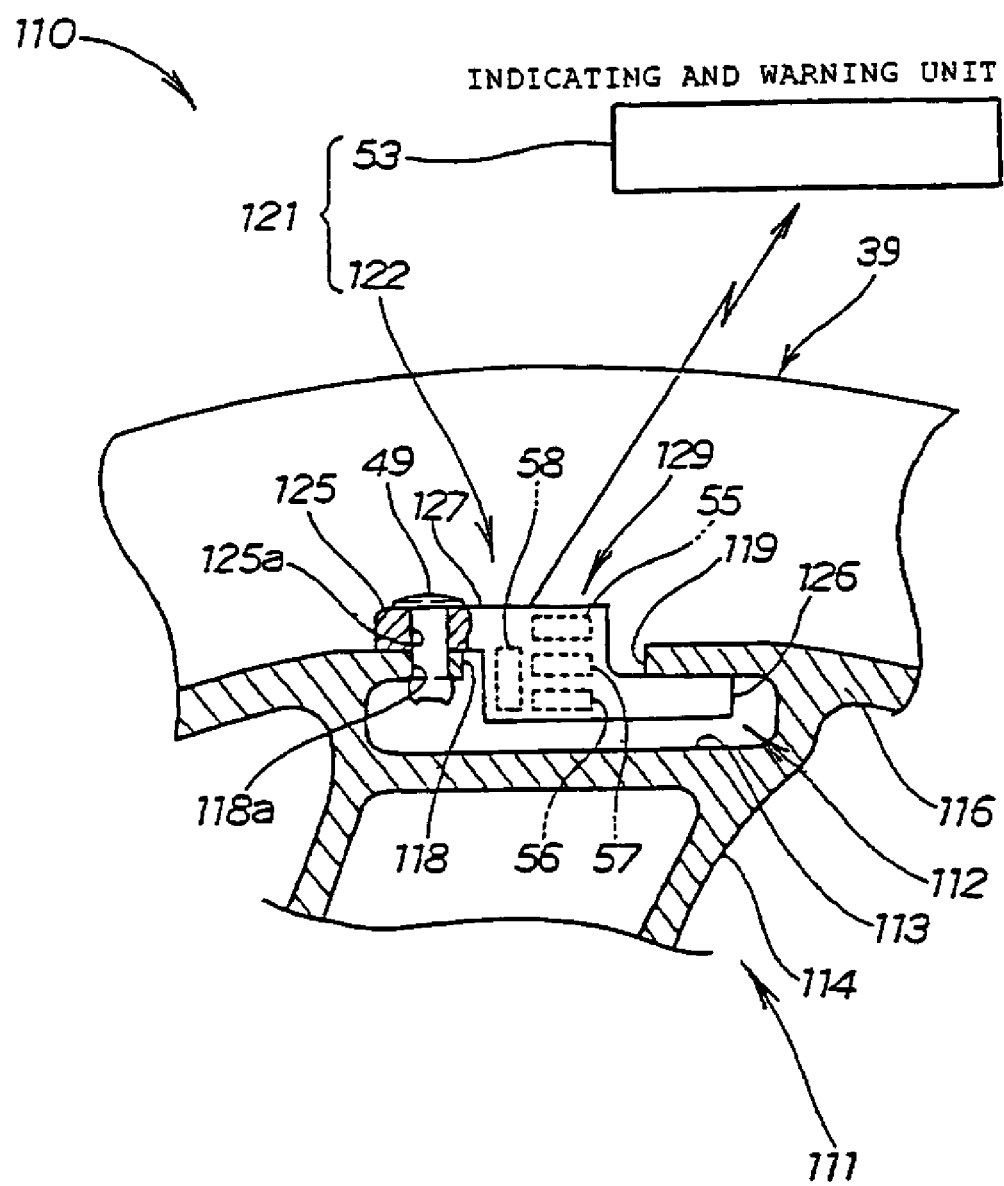
FIG. 10 is a cross-sectional front view of a mounting structure of a tire pressure sensing system of a fifth embodiment according to the present invention.
Figure 11:
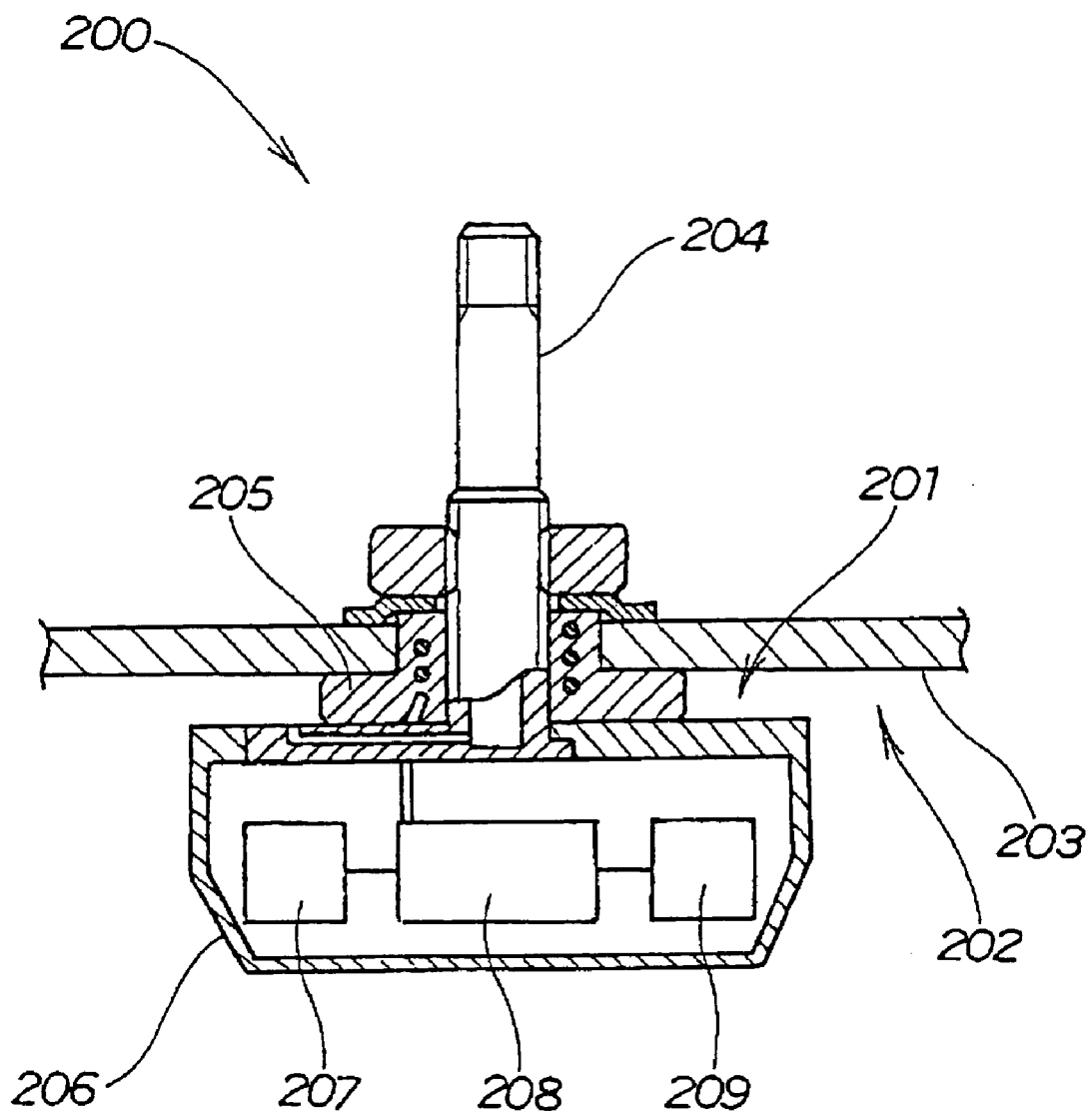
FIG. 11 is a reproduction of FIG. 1 of Japanese Patent Laid-Open Publication No. Heisei 10-44726.

FIG. 10 is a cross-sectional front view of a mounting structure of a tire pressure sensing system of a fifth embodiment according to the present invention. The same parts as those used in the mounting structure of a tire pressure sensing system 40 (see FIG. 4) are denoted by the same referential numerals, and detailed description thereof is omitted.

In the mounting structure of a tire pressure sensing system 110, a recessed portion 113 is formed in a boundary portion 112 between a rim portion 116 and spoke portions (connecting portions) 114 of a wheel 111. In addition, a collar 118, where one end 125 of a case 129 of a detection and transmitting unit 122 is mounted, is formed in the boundary portion 112. A contacting portion 119 is formed to be in contact with the other end 126 of the case 129. Therefore, the case 129 is fixed at one side, and, at the same time, a part of a body portion 127 of the case 129 is lowered down into the recessed portion 113.

FIG. 10 shows the tire 39, a rivet 49, an indicating and warning unit 43, a pressure sensor 55, a detection circuit 56, a transmitting circuit 57, a battery 58, a mounting hole 118a formed in the collar 118, a tire pressure sensing system 121 having the same function as that of the tire pressure sensing system 51 (see FIG. 4), and a through hole 125a formed in one end 125. Note that the wheel 111 is provided with a hub portion and an air valve which are similar to those in the wheel 41 shown in FIG. 2.

In the mounting structure of a tire pressure sensing system 110, the case 129 is fixed on one side, thus realizing a diminution of man-hour for mounting the detecting and transmitting unit 122 (tire pressure sensing system).

Note that, in the embodiments, the vehicle was explained as the motorcycle 10 as shown in FIG. 1. However, the vehicle is not limited to the motorcycle and may be a four-wheeled vehicle or a three-wheeled vehicle.

Moreover, in the embodiments, the case 59 is mounted on the collars 48 and 48 by the use of the rivets 49 and 49 as shown in FIG. 4. However, members for mounting the case 59 to the collars 48 and 48 are not limited to the rivets 49 and 49. The case 59 may be mounted by a screw, a fastener, or a belt.

The present invention realizes the following effects by employing the foregoing construction.

According to the first aspect of the invention, when the wheel is the cast wheel for the vehicle which is constructed by the rim portion where the tire is mounted, the hub portion provided at a center of the rim portion, and the spoke portions connecting the rim portion and the hub portion, the pressure sensor is placed in the boundary portion between the rim portion and the spoke portions. Specifically, since the pressure sensor is placed in the boundary portion between the rim portion and the spoke portions, a portion protruding toward into the tire when replacing a tire can be reduced. Consequently, workability for tire replacement can be improved.

According to the second aspect of the invention, the recessed portion having the shape recessed toward the hub portion is provided in the boundary portion, and the pressure sensor is placed in the recessed portion. Thus, the pressure sensor does not protrude to inside of the tire and can be lowered down to the spoke portions. Consequently, workability for tire replacement can be further improved.

According to the third aspect of the invention, the pressure sensor is placed on the opposite side of the air valve which fills air to the tire, and thereby the weight of the wheel can be distributed to the weight around the pressure sensor and that of the air valve. Accordingly, tire dynamic imbalance can be kept at a minimum. For example, the dynamic balance of the tire can be corrected by a small balance weight, thus reducing the weight of the wheel.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mounting structure of a tire pressure sensing system in which a pressure sensor is placed on a wheel to sense pressure of a tire which is mounted on the wheel,
wherein the wheel is a cast wheel for a vehicle including a rim portion where the tire is mounted, a hub portion provided at a center of the rim portion, and spoke portions connecting the rim portion and the hub portion, and
the air pressure sensor is placed in a boundary portion between the rim portion and the spoke portions,
wherein a central part of an outer surface of the air pressure sensor is exposed and faces radially outward toward an interior of the tire, and
wherein a central part of an inner surface of the air pressure sensor is separated by a space from the wheel in a radially inward direction.

2. The mounting structure of a tire pressure sensing system according to claim 1, wherein a recessed portion having a shape depressed inwardly toward the hub portion is provided, the recessed portion extending into a radially outward end of one of the spoke portions, and the air pressure sensor is placed in the recessed portion.

3. The mounting structure of a tire pressure sensing system according to claim 1, wherein the air pressure sensor is placed on an opposite side of the wheel with respect to an air valve which fills air to the tire.

4. The mounting structure of a tire pressure sensing system according to claim 2, wherein the air pressure sensor is placed on an opposite side of the wheel with respect to an air valve which fills air to the tire.

5. The mounting structure of a tire pressure sensing system according to claim 1, wherein the air pressure sensor is placed on a side of the wheel which is 180 degrees (+/−20 degrees) with respect to a location of an air valve which fills air to the tire.

6. The mounting structure of a tire pressure sensing system according to claim 2, wherein collars are formed in the boundary portion, the tire pressure system being mounted on the collars with fastening members.

7. The mounting structure of a tire pressure sensing system according to claim 2, wherein an insertion hole is formed in the boundary portion between the rim portion and the spoke portion, through which a detecting and transmitting unit is inserted into the recessed portion.

8. The mounting structure of a tire pressure sensing system according to claim 2, wherein the air pressure sensor does not protrude into the tire and extends into the spoke portions.

9. The mounting structure of a tire pressure sensing system according to claim 1, wherein the air pressure sensor is mounted on a stay with a rivet, the stay having bent portions which are formed on ends thereof, the bent portions being welded to the rim portion.

10. The mounting structure of a tire pressure sensing system according to claim 9, wherein an escape hole is provided allowing a body portion of the air pressure sensor to escape.

11. A mounting structure of a tire pressure sensing system in which a pressure sensor is placed on a wheel to sense pressure of a tire which is mounted on the wheel,
wherein the wheel is a cast wheel for a vehicle including a rim portion where the tire is mounted, a hub portion provided at a center of the rim portion, and spoke portions connecting the rim portion and the hub portion,
the air pressure sensor is placed in a boundary portion between the rim portion and the spoke portions,
wherein an air valve which fills the tire being positioned separately from the air pressure sensor,
wherein a central part of an outer surface of the air pressure sensor is exposed and faces radially outward toward an interior of the tire, and
wherein a central part of an inner surface of the air pressure sensor is separated by a space from the wheel in a radially inward direction.

12. The mounting structure of a tire pressure sensing system according to claim 11, wherein a recessed portion having a shape depressed inwardly toward the hub portion is provided, the recessed portion extending into a radially outward end of one of the spoke portions, and the air pressure sensor is placed in the recessed portion.

13. The mounting structure of a tire pressure sensing system according to claim 11, wherein the air pressure sensor is placed on an opposite side of the wheel with respect to the air valve which fills the air to the tire.

14. The mounting structure of a tire pressure sensing system according to claim 12, wherein the air pressure sensor is placed on an opposite side of the wheel with respect to the air valve which fills air to the tire.

15. The mounting structure of a tire pressure sensing system according to claim 11, wherein the air pressure sensor is placed on a side of the wheel which is 180 degrees (+/−20 degrees) with respect to a location of the air valve which fills air to the tire.

16. The mounting structure of a tire pressure sensing system according to claim 12, wherein collars are formed in the boundary portion, the tire pressure sensing system being mounted on the collars with fastening members.

17. The mounting structure of a tire pressure sensing system according to claim 12, wherein an insertion hole is formed in the boundary portion between the rim portion and the spoke portion, through which a detecting and transmitting unit is inserted into the recessed portion.

18. The mounting structure of a tire pressure sensing system according to claim 12, wherein the air pressure sensor does not protrude into the tire and extends into the spoke portions.

19. The mounting structure of a tire pressure sensing system according to claim 11, wherein the air pressure sensor is mounted on a stay with a rivet, the stay having bent portions which are formed on ends thereof, the bent portions being welded to the rim portion.

20. The mounting structure of a tire pressure sensing system according to claim 19, wherein an escape hole is provided allowing a body portion of the air pressure sensor to escape.

* * * * *